June 23, 1970     A. L. LEE ET AL     3,516,508
FLEXIBLE SHUTTLE CAR
Original Filed Oct. 11, 1965     5 Sheets-Sheet 1
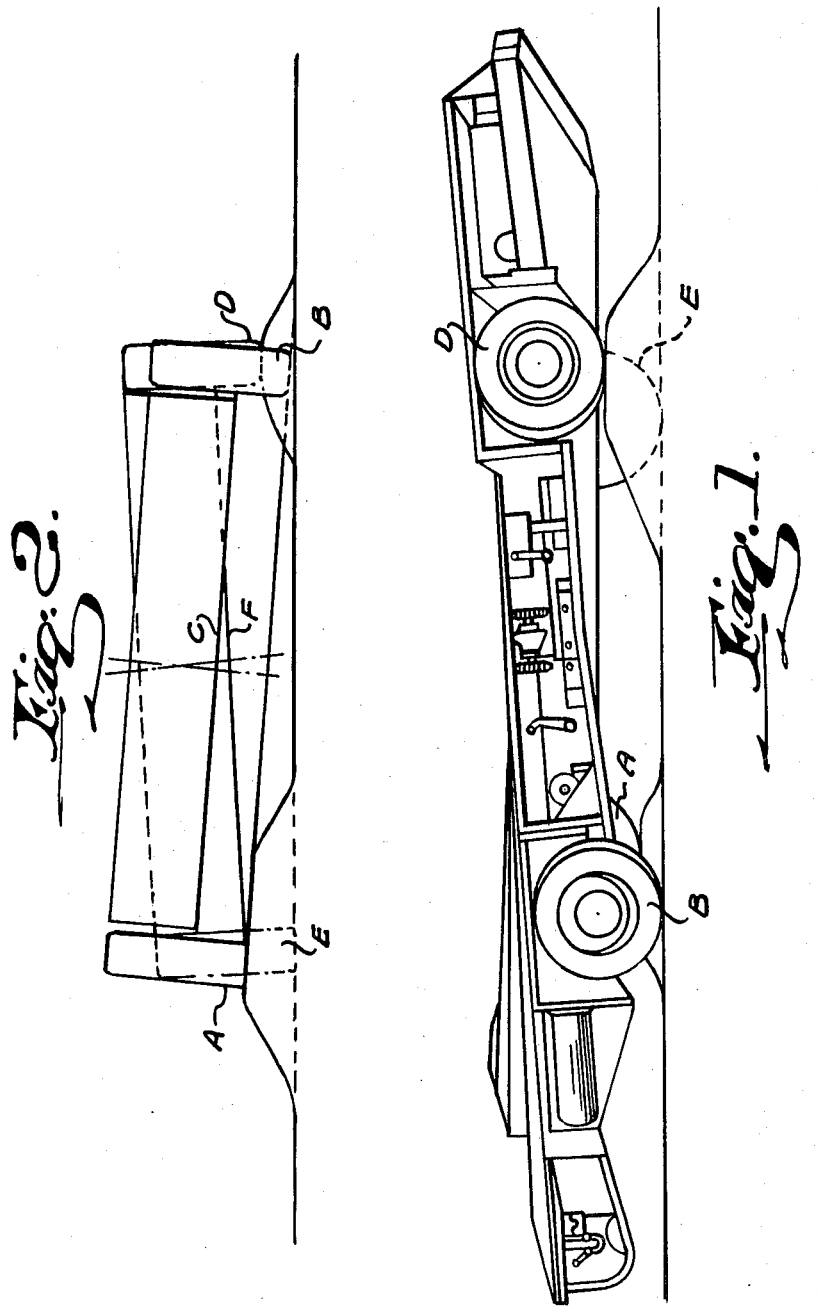
INVENTORS.
ARTHUR L. LEE,
ARTHUR B COVAL.
BY
their ATTORNEY.

June 23, 1970  A. L. LEE ET AL  3,516,508
FLEXIBLE SHUTTLE CAR
Original Filed Oct. 11, 1965  5 Sheets-Sheet 2
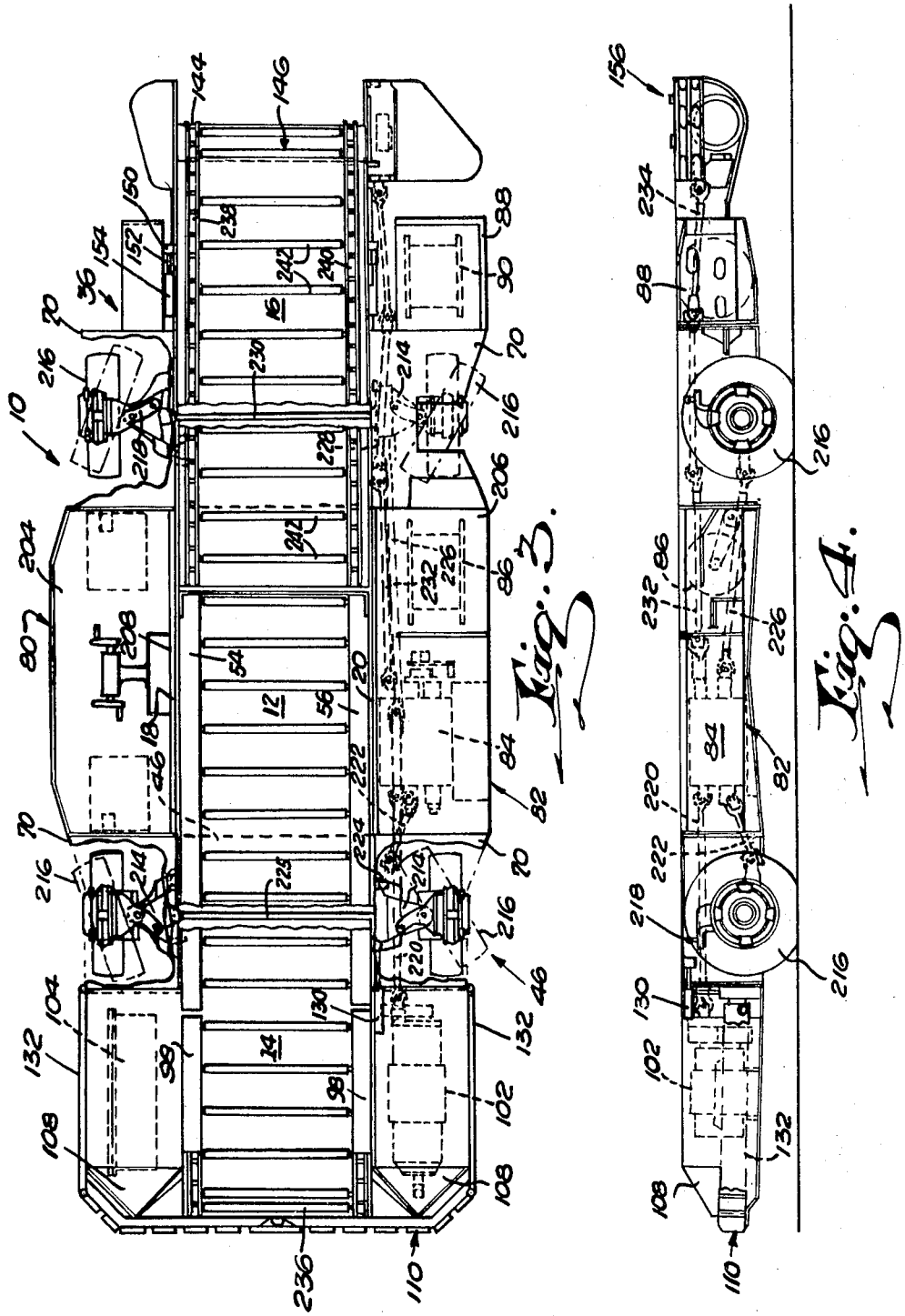
INVENTORS.
ARTHUR L. LEE,
ARTHUR B. COVAL.
BY Stanley J Price
their ATTORNEY.

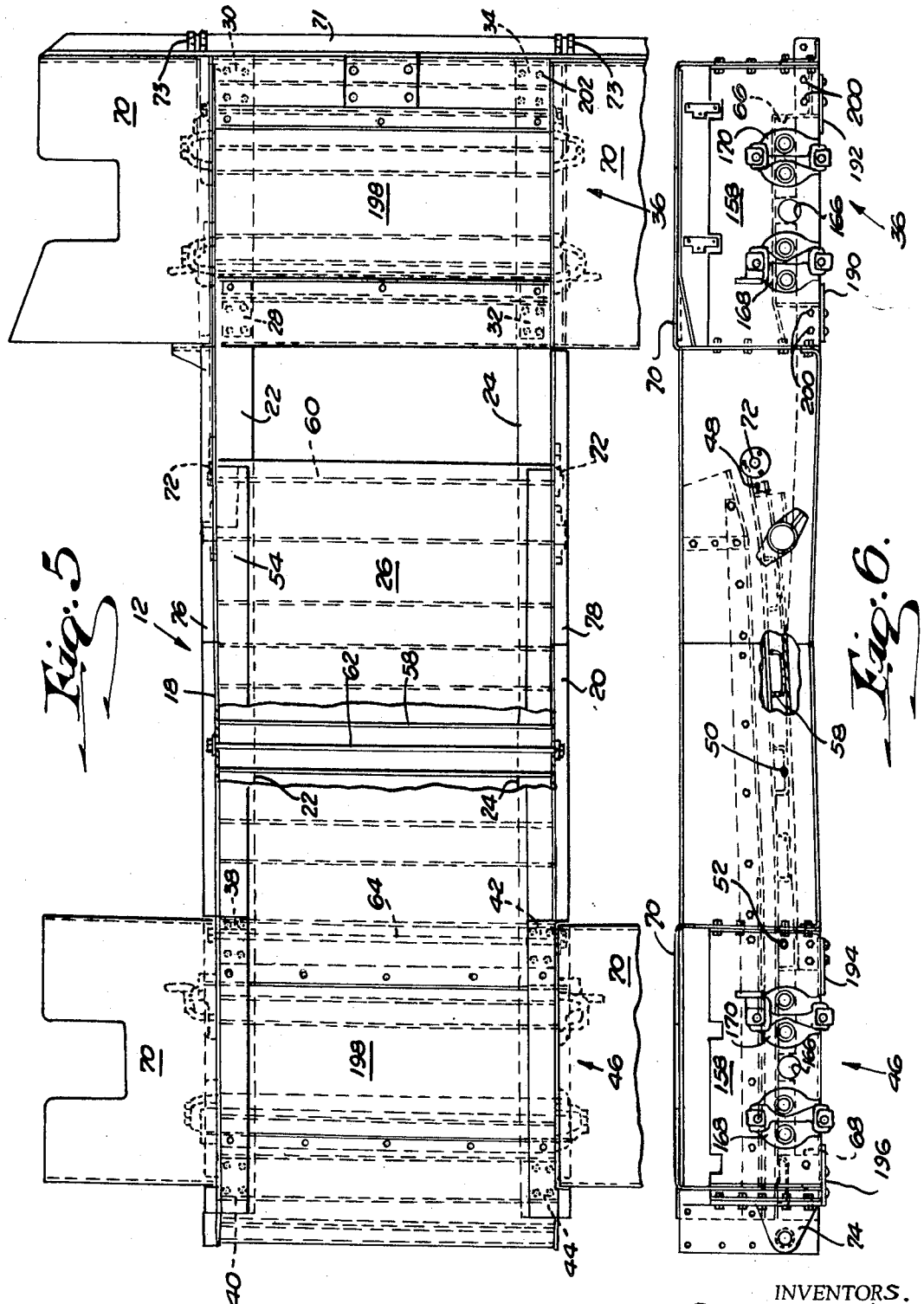

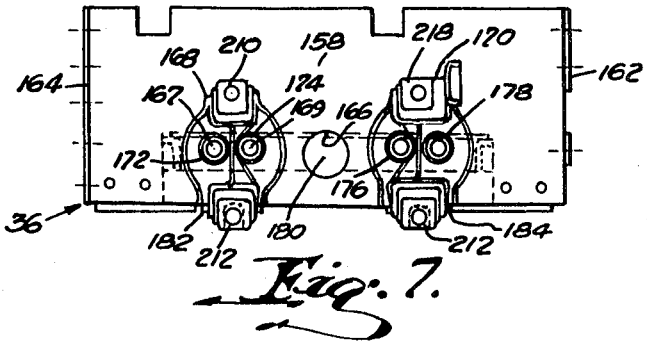
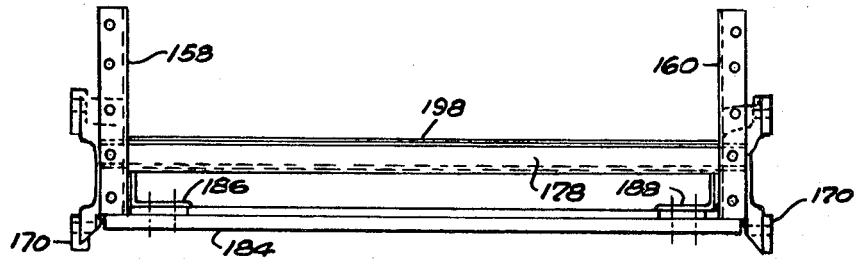
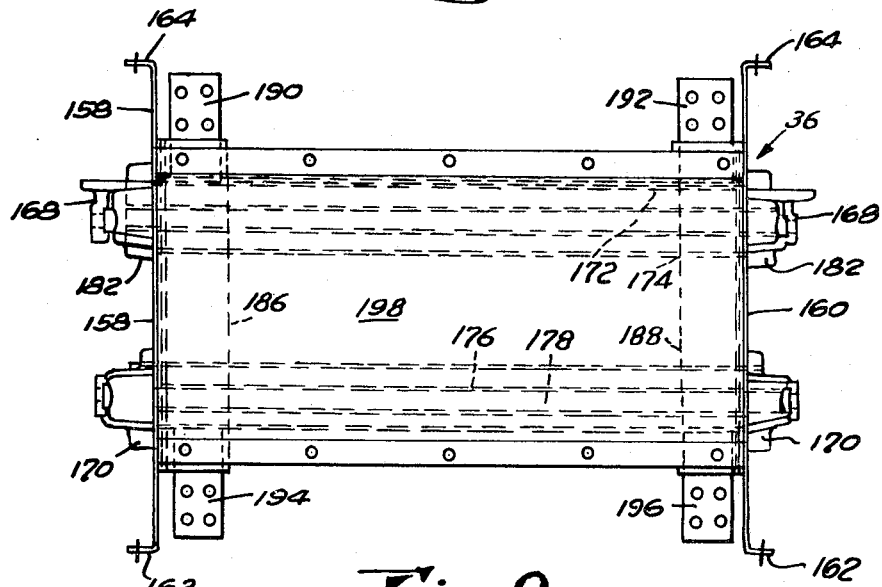

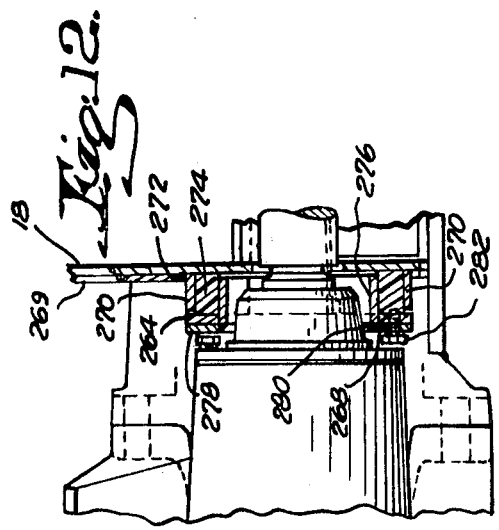
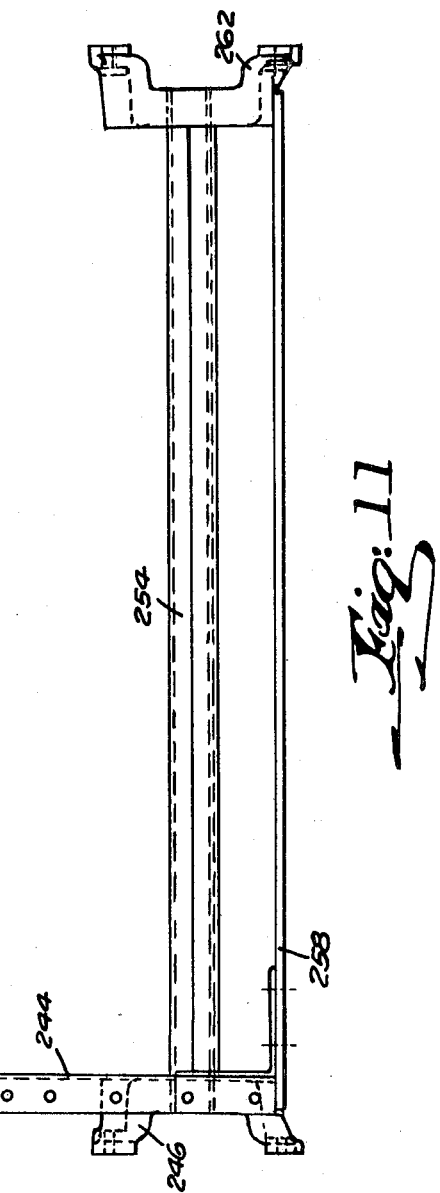
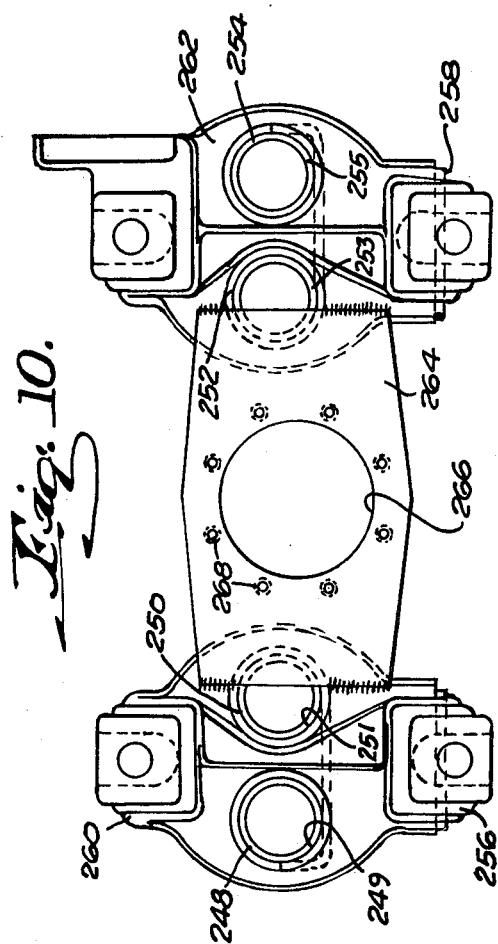
INVENTORS
ARTHUR L. LEE,
ARTHUR B. COVAL.
BY
their ATTORNEY.

United States Patent Office 3,516,508
Patented June 23, 1970

1

3,516,508
FLEXIBLE SHUTTLE CAR
Arthur L. Lee and Arthur B. Coval, Columbus, Ohio, assignors, by mesne assignments, to Consolidation Coal Company, Pittsburgh, Pa., a corporation of Delaware
Original application Oct. 11, 1965, Ser. No. 494,783, now Patent No. 3,403,797, dated Oct. 1, 1968. Divided and this application Apr. 30, 1968, Ser. No. 739,986
Int. Cl. B60b 35/00
U.S. Cl. 180—85       4 Claims

ABSTRACT OF THE DISCLOSURE

A haulage vehicle having a flexible body mounted on a pair of relatively rigid axle assemblies. The flexible body has a pair of vertical side plates forming the side walls of an elongated trough shaped material haulage compartment. A deck plate is supported by the flexible side plates and forms a bottom wall for the haulage compartment. The relatively rigid axle assemblies are connected to the side plates adjacent the end portion of the side plates so that the side plates remain free to flex when the haulage vehicle is subjected to torsional stresses. The axle assemblies have pairs of driven and steerable wheels mounted thereon for supporting the flexible body and propelling the vehicle.

CROSS REFERENCES TO RELATED APPLICATIONS

This application is a division of application Ser. No. 494,783, filed Oct. 11, 1965 and since issued as Pat. No. 3,403,797.

This invention relates to a haulage vehicle for hauling loose material in underground mines, and more particularly to a relatively flexible haulage vehicle that follows the contours and undulations of uneven mine floors.

The conventional shuttle car has a rigid body with a material haulage compartment extending lengthwise thereof. A pair of driven and steerable wheels are connected to the rigid body adjacent one end, and the other pair of driven and steerable wheels are connected to an equalizer axle that extends transversely beneath the body adjacent the other end. The equalizer axle is pivotally connected to the body on the longitudinal axis of the vehicle. The pivotally secured axle provides a three point suspension for the vehicle and permits limited vertical movement of the propelling wheels connected thereto. The principal function of the equalizer axle is to reduce the torsional or twisting forces exerted on the rigid body as the haulage vehicle travels over uneven surfaces. The vertical movement of the propelling wheels connected to the equalizer axle is, however, limited by the space limitations of the vehicle. Where conditions of relatively severe undulations exist in the mine floor, the conventional shuttle car with the rigid body loses a portion of its tractive effort due to the inability of the propelling wheels to follow the irregular contours of the mine floor. There is a need for a haulage vehicle that has a flexible body capable of following relatively severe undulations in the mine floor so that all four wheels retain substantially the same tractive power.

U.S. Pat. No. 3,185,325 to Stalker entitled "Shuttle Car" recognized the need for a flexible haulage vehicle capable of flexing and conforming to the undulations of an uneven mine floor. It is suggested in order to obtain the desired degree of flexibility that the side plates or body of the material haulage compartment be fabricated from a lightweight material having a relatively thin cross section. The side plates are connected to each other adjacent their lower edge portions by transversely extending channel shaped spacer beams. The relationship of the side plates and spacer beams is such that they form a torsionally unstable column with sufficient torsional instability to permit the frame to flex and follow the contours of the undulating terrain. The frame is supported by driven and steered propelling wheels having wheel housings mounted on wheel mounting brackets. The wheel mounting brackets are, in turn, connected to the outside of the side walls. With the arrangement suggested in U.S. Pat. No. 3,185,325 the load carrying capacity of the vehicle is severely limited for the following reason.

The material haulage compartment is channel shaped with the side plates forming the vertical side walls of the haulage compartment. The wheel brackets and mounting brackets are directly connected to the thin flexible side plates of the vehicle and extend laterally therefrom. The wheel brackets and mounting brackets act as a horizontally extending lever connected at one end to the thin side plates and have the propelling wheels mounted on the other end thereof. The load carried by the haulage vehicle is supported by the four propelling wheels connected to the end poritons of the horizontally extending levers. The bending moment exerted on the levers tending to bend the vehicle side plates inwardly toward the inner portion of the material haulage compartment and cant or deflect the wheels from a vertical plane is proportional to the load carried by the vehicle. It is stated in the above patent that it is necessary to fabricate the side plates of the body from a lightweight material having a relatively thin cross section to obtain the torsional instability required to permit the frame to flex. A side plate fabricated of the thin flexible material would be unable to support a substantial load without inward deflection as above discussed.

Briefly, the invention is directed to a haulage vehicle having a flexible body capable of following the contours of an undulating surface and capable of transporting substantial loads without inward deflection of the body side plates. The haulage vehicle has a flexible main body assembly with a pair of axle assemblies connected thereto. The axle assemblies have pairs of mounting brackets on opposite ends thereof connected to each other by support members extending transversely beneath the deck of the haulage compartment. Certain of the support members are compression members arranged to carry the load in the haulage compartment in compression while other of the support members are tension members arranged to carry the load in tension and maintain the propelling wheels in vertical planes under substantial load conditions in the flexible body.

Another feature includes a pair of cable reels supported by a side plate of the flexible body in tandem and on opposite sides of an axle assembly. Where the flexible haulage vehicle is to be subjected to severe undulations and maximum flexibility is desired, one of the wheel mounting brackets of each axle assembly may be movably connected to the body side plates. With this arrangement the torsional twisting of the body is taken up in the connection and not transmitted to the axle assembly. The flexible body may thus deflect and twist relative to the axle assemblies.

It is, therefore, a primary object of this invention to provide a flexible haulage vehicle capable of conforming to relatively severe undulations in an uneven mine floor and capable of transporting substantial loads of loose material.

Another object of this invention is to provide a flexible haulage vehicle that has axle assemblies on which the flexible body is mounted.

A still further object of this invention is to provide an axle assembly for a flexible haulage vehicle that has separate compression members and tensions members through which the load in the haulage vehicle is transmitted to the propelling wheels.

A still further object of this invention is to provide a flexible haulage vehicle that has axle assemblies movably connected to the vehicle body to permit relative movement therebetween during the flexure of the vehicle body.

These and other objects and advantages of the invention will be more completely disclosed and described in the following specification, the accompanying drawings and the appended claims.

In the drawings:

FIG. 1 is a perspective view of the flexible haulage vehicle in a deflected position illustrating the flexure of the vehicle.

FIG. 2 is a diagrammatic end view illustrating the helical or corkscrew deflection in the body between the pairs of front wheels and rear wheels.

FIG. 3 is a top plan view of the haulage vehicle with portions of the fenders broken away illustrating portions of the axle assemblies with the wheel mounting brackets and propelling wheels mounted thereon.

FIG. 4 is a view in side elevation of the haulage vehicle illustrated in FIG. 3.

FIG. 5 is a top plan view of the main body assembly with the axle assemblies connected thereto and with portions broken away to illustrate the elongated draw bolts connecting the side plates to each other.

FIG. 6 is a view in side elevation of the main frame assembly with parts broken away to illustrate the channel shaped reinforcing members for the deck plate.

FIG. 7 is an end view of one embodiment of the axle assembly.

FIG. 8 is a view in side elevation of the axle assembly illustrated in FIG. 7.

FIG. 9 is a view in top plan of the axle assembly illustrated in FIGS. 7 and 8.

FIG. 10 is a view in side elevation of another embodiment of the axle assembly.

FIG. 11 is a view in front elevation of the axle assembly illustrated in FIG. 10.

FIG. 12 is a fragmentary view in side elevation illustrating the manner in which one side of the axle assembly illustrated in FIG. 10 is connected to the body side wall.

Referring to the drawings there is illustrated in FIGS. 3 and 4 a flexible haulage vehicle generally designated by the numeral 10 that has a main body assembly 12, a tail section assembly 14 and a boom section 16. The main body assembly 12 is illustrated in detail in FIGS. 5 and 6.

Referring to FIGS. 5 and 6, the main body assembly 12 has a pair of vertical side plates 18 and 20 with inturned flange portions 22 and 24 on which is positioned a deck plate 26. The side plates 18 and 20 have inturned bolt pads 28, 30, 32 and 34 to which the front axle assembly 36 is secured. Similarly, the side plates 18 and 20 have inwardly extending bolt pads 38, 40, 42 and 44 to which the rear axle assembly 46 is secured. The side plates 18 and 20 each have aligned draw bolt apertures 48, 50 and 52 therethrough and inwardly extending elongated chain guides 54 and 56 that are spaced above the deck plate 26. The deck plate 26 has a plurality of channel shaped stiffening members 58 extending transversely thereacross to prevent a sag in the deck plate 26 when it supports a load in the material haulage compartment. The channel shaped members 58 rest on the inturned flanges 24 of the respective side plates 18 and 20. Draw bolts 60, 62 and 64 extend through respective apertures 48, 50 and 52 in the side plates 18 and 20 and urge the side plates 18 toward each other, and thus form a channel shaped material haulage compartment with the vertical side plates 18 and 20 forming the side walls of the channel shaped material haulage compartment and the deck plate 26 forming a portion of the bottom wall of the haulage compartment.

The draw bolt connections between the side plates 18 and 20 permit the side plates to flex vertically relative to each other about transverse axes of the haulage compartment to thus provide a flexible main body for the haulage vehicle. The axle assemblies 36 and 46, to be later described in detail, are positioned in receiving recesses 66 and 68 in the side plates 18 and 20. The axle assemblies 36 and 46 are secured to the side plates 18 and 20 by means of bolt pads on the axle assemblies mating with the bolt pads 28, 30, 32, 34, 38, 40, 42 and 44 on the respective side plates 18 and 20. Fender compartments 70 are connected to the axle assemblies 36 and 46. An angle shaped beam 71 is secured to the front of the axle assembly 36 and the fender compartments 70 and has receivers 73 for the boom actuator, later described.

The side plates 18 and 20 have aligned apertures 72 therethrough arranged to receive the pivot shaft of the boom assembly 16 and a hinge connection 74 to receive the shaft of the pivoted tail section 14. The side plates 18 and 20 have outwardly extending flanged portions 76 and 78 extending longitudinally between the axle assemblies 36 and 46. Suitable plate-like supporting means are positioned on the flanged portions 76 and 78 and are suitably secured to the respective side plates 18 and 20 and to the depending side walls of the fender compartments 70 to form, on one side of the vehicle, an operator's compartment 80 (FIG. 3), and on the other side of the vehicle, a compartment 82 to house a transmission 84 and a cable reel 86. A compartment 88 for a second cable reel 90 is secured to the depending side wall of the fender compartment 70 on the opposite side of the axle assembly 36 to provide a pair of cable reels 86 and 90 arranged in tandem on opposite sides of the axle assembly 36 and on the same side of the vehicle. As illustrated in FIG. 4, the side plates 18 and 20 and the plates forming the supporting means for the operator's compartment 80 and compartment 82 have inclined surfaces to provide for maximum road clearance at the center of the vehicle.

FIGS. 7, 8 and 9 illustrate one embodiment of the front axle assembly 36. It should be understood that the front axle asembly 36 and the rear axle assembly 46 are of substantially the same construction and have interchangeable parts. The axle assembly 36 has a pair of vertical side plates 158 and 160 with outturned side flanges 162 and 164. The plates 158 and 160 are positioned in spaced parallel relation with each other and each has a central drive shaft aperture 166 therethrough. A pair of axle brackets 168 and 170 are positioned on opposite sides of the aperture 166. Each of the axle brackets 168 and 170 has a pair of spaced apertures 167 and 169 therethrough. Tubular support members 172 and 174 extend transversely across the axle assembly through apertures in plates 158 and 160 and through the apertures 167 and 169 in both of the spaced axle brackets 168. The ends of the tubular supports are secured to the plates 158 and 160 and axle brackets 168 as by welding or the like. A similar pair of tubular support members 176 and 178 extend transversely across the axle assembly, through apertures in plates 156 and 160 and through the apertures 167 and 169 in both of the axle brackets 170. The tubular support members 176 and 178 are secured to the pair of spaced axle brackets 170 by welding or the like. The tubular support members 172, 174, 176 and 178 are positioned in a plane that includes the drive axis designated by the numeral 180 in FIG. 7. The tubular support members 172, 174, 176 and 178 support the haulage vehicle 10 in compression and may be defined as compressive support members.

The pair of axle brackets 168 have a transversely extending strap-like support member 182 secured to their lower edge portion and extending transversely across the lower portion of the axle assembly 36. A similar strap-like support member 184 is secured to the axle brackets 170 positioned on the opposite side of the drive axis. The strap-like support members are arranged to support the haulage vehicle 10 in tension and may be defined as tensional support members 182 and 184. Longitudinally extending angular members 186 and 188 are secured to both the strap-like support members 182 and 184 and the vertical plates 158 and 160. Extending longitudinally from the transverse strap-like supports are bolt pads 190, 192, 194 and 196. A plate member 198 is secured to the transverse supports 172, 174, 176 and 178 above the aperture 166 and serves as a bottom wall for the portion of the haulage compartment.

The axle assemblies 36 and 46 are secured to the side plates 18 and 20 in the following manner (FIG. 5). The axle assemblies, for example axle assembly 36, are positioned transversely of side plates 18 and 20 with the inner wall of side plates 158 and 160 abutting the outer wall of body side plates 18 and 20 with the transverse support members 172, 174, 176 and 178 positioned in the receiving recesses 66 in the side plates 18 and 20. The axle assemblies are then bolted by means of bolts 200 (FIG. 6) extending through aligned horizontal apertures in the adjacent side plates of the body and the axle assembly. The axle assembly bolt pads 190, 192, 194 and 196 are in underlying relation with bolt pads 32, 28, 34 and 30. Bolts 202 (FIG. 5) extend through mating apertures in the respective pads to secure the axle assemblies to the body side plates 18 and 20. Where desired, the axle assembly side plates 158 may be secured to the body side plates 18 and 20 by other suitable means such as welding or the like. It is preferred, however, to facilitate the assembly and disassembly of the vehicle, that bolts be employed to secure the various components to each other. The axle assembly 46 is secured to the side plates 18 and 20 in substantially the same manner.

Channel shaped fender compartments 70 have their vertical side walls bolted to the outwardly extending flange 164 on the respective axle assembly side plates 158 and 160. Elongated members 204 and 206 are suitably secured to the side walls of the fender compartments 70 adjacent their lower edge portions and span the distance between the axle assemblies to form the compartments 80 and 82. A portion of member 204 is supported on the outturned flange 76 of side plate 18. Similarly, an edge portion of member 206 is supported on flange 78 of side plate 20. The elongated member has an upwardly extending portion 208 (FIG. 3) that is suitably bolted intermediate its end portions to the side plate 18. The elongated member 204 has upturned end portions that are suitably bolted to the depending sides of the adjacent fender compartments 70 to provide a three point connection for the operator's compartment 80. This arrangement permits the elongated member 204 to freely flex when the main body assembly 12 is subjected to torsional forces. The three point connection of the operator's compartment 80 does not restrict to any substantial extent the flexibility of the side plates 18 and 20, since the member 204 is connected to the fender compartment side walls which, in turn, form an extension of the relatively rigid axle assemblies 36 and 46. Thus, when the main body assembly is subjected to a twisting or torsion force, the elongated member 204 is free to pivot about the single bolt connection to the side plates 18. The elongated member 206 is also suitably connected to the fender compartment side walls in a manner that it does not restrict substantially the flexibility of side plate 20.

The axle brackets 168 and 170 each has upper and lower pads 210 and 212 to which a wheel unit 214 is secured. A wheel member 216 is mounted on each of the wheel units 214 and supports the haulage vehicle 10 (FIGS. 3 and 4). The wheel unit 214 on which the wheel 216 is mounted is constructed so that the wheel 216 is both driven and steered. The steering arms 218 are suitably connected to a steering mechanism (not shown) to provide for the desired controlled steering of all of the wheels 216, as is illustrated in FIG. 3.

The wheels are driven from a single prime mover, i.e. electric motor 102, through a multispeed transmission 84. The drive train includes input shafting 220 connecting the electric motor 102 and the transmission 84. From the transmission 84, output shafting extends rearwardly to a differential mechanism 224 adjacent the right rear wheel unit 214. From the differential 224, transverse shafting 225 extends through apertures 166 in the axle assembly side plates and transversely beneath the haulage compartment of the vehicle to the left rear wheel unit 214. The transverse shafting 225 is suitably connected to gearing within the left rear wheel unit 214 to propel the left rear wheel 216. An output shaft from differential 224 is connected to suitable gearing in the right rear wheel unit 214 to propel the right rear wheel 216.

An output shaft 226 extends forwardly from the transmission 84 and is connected to a front differential 228 adjacent the right front wheel unit 214. Similar transverse shafting 230 extends across the haulage compartment to the left front wheel unit 214 to provide drive for left front wheel 216 and gearing within the right front wheel unit 214 is connected to the differential 228 by suitable shafting. With this arrangement, all four wheels 216 are propelled from a single propelling means, i.e. electric motor 102. The motor 102 is, as previously described, supported on the external portion of the tail section 14 and the transmission is supported within compartment 82 on the main body section 12. There is also provided forwardly extending shafting 232 connecting an output of the transmission 84 with a drive means 234 for the drive sprockets 144 of the endless chain conveyor 146.

An endless chain type conveyor generally designated by the numeral 146 has a pair of endless chains 238 and 240 reeved about spaced drive sprockets 144 journaled in the end portion of the boom 16 and about other spaced sprockets 236 suitably supported in tail section 14. The pair of chains 238 and 240 have spaced flights 242 extending transversely therebetween and are arranged to convey the load of loose material within the haulage compartment. The chains 238 and 240 extend beneath the laterally extending guides 54 and 56 on the side plates of the main body assembly 12 and the laterally extending guides 98 on the tail section 14.

The conveyor 146 is arranged to load material into and discharge material from the elongated trough shaped compartment formed by the spaced vertical side plates and decking in the main assembly 12, tail section 14 and boom assembly 16. As previously discussed, the hydraulic actuator 154 is arranged to elevate the boom to discharge the material in the haulage compartment onto an elevated receiver such as an endless conveyor belt or the like.

In FIGS. 10, 11 and 12 there is disclosed another embodiment of an axle assembly suitable for use with the haulage vehicle previously described. The axle assembly illustrated in FIGS. 10, 11 and 12 has a vertical plate 244 similar to the vertical plate 158 and a pair of spaced axle brackets 246 similar to the axle brackets 168 and 179. Extending transversely in the same horizontal plane as the drive shaft axis and on opposite sides thereof are pairs of support members 248, 250, 252 and 254 which are similar to the support members 172, 174, 176 and 178, as previously described. The support members 248, 250, 252 and 254 extend through apertures in the plate 244 and apertures in the axle brackets 246 and are secured to the axle brackets 246 and plate 244 by welding or the like. The support members 248, 250, 252 and 254 are arranged to support the haulage vehicle in compression, as has been previously described. A pair of strap-like support members 256 and 258 are secured to the lower portions of the spaced axle brackets 246 and support the haulage vehicle in tension. The arrangement of the side plate 244, axle brackets 246 and support members 248, 250, 252, 254, 258 and 258 on one side of the axle assembly illustrated in FIGS. 10, 11 and 12 is substantially the same as one side of the axle assembly illustrated in FIGS. 7, 8 and 9.

On the opposite side of the axle assembly illustrated in FIGS. 10, 11 and 12 a pair of axle brackets 260 and 262

(FIG. 10) are secured to each other in spaced relation by means of a plate 264 suitably welded to the front face of the axle brackets 260 and 262. The plate 264 has a drive shaft aperture 266 therethrough with a plurality of threaded bolt apertures 268 extending therearound. The tubular support members 248 and 250 extend through apertures 249 and 251 in axle bracket 260 and are secured thereto as by welding or the like. Similarly, the tubular supports 252 and 254 extend through apertures 253 and 255 in axle bracket 262 and are welded thereto. The strap-like supports 256 and 258 are secured to the lower portions of the respective axle brackets 260 and 262.

The side plate 18 of the main body assembly 12 has a plate 269, similar to the plate 244, suitably secured thereto to provide the flange connecting means for the fender compartment 70. The side plate 18 also has a cylindrical receiver 270 secured thereto as by the weld 272. An annular rubber member 274 is positioned within the cylindrical receiver 270 and the axle assembly plate 264 is positioned in overlying relation therewith. A cylindrical support 276 having a radially extending annular flange 278 is positioned with the cylindrical support 276 extending through the drive shaft aperture 266 into overlying relation with the inner peripheral surface of the annular resilient member 274. The radially extending annular flange 278 is positioned in overlying relation with the outer surface of plate 264. The radially extending flange 278 has bolt receiving apertures 280 therethrough which are aligned with the threaded apertures 268 in the plate 264. Bolts 282 extend through the aligned apertures 280 and 268 and secure the support member 276 to the plate 264. With this arrangement, the axle assembly is rotatably connected to the side plate 18 to permit the side plate 18 to flex or rotate relative thereto when the body assembly 12 is subjected to torsional stresses. If desired, both axle assemblies 36 and 46 may have the modifications of the embodiment illustrated in FIGS. 10, 11 and 12.

The haulage vehicle previously described comprises generally a main body assembly 12 with a tail section assembly 14 pivotally secured thereto. The body assembly 12, tail section assembly 14 and boom 16 have vertical spaced side plates and a transversely extending deck plate therebetween that forms an elongated trough shaped haulage compartment for the vehicle 10. An endless conveyor 146 is provided that extends throughout the entire length of the trough shaped haulage compartment and is arranged to load material into and discharge material from the elongated haulage compartment.

The trough shaped compartment of the main body assembly 12 between the axle assemblies 36 and 46 is flexible and deflects when the haulage vehicle is subjected to torsion or twisting forces because of undulations or uneven terrain, as is illustrated in FIG. 1. The axle assemblies 36 and 46 are of rugged construction and are relatively rigid when compared with the trough shaped haulage compartment therebetween. The axle assemblies do not deflect to any substantial extent and remain substantially linear along the drive axis of the axle assemblies as the body assembly comprising the side plates 18 and deck plate 26 are twisted or deflected by torsional loads to which the haulage vehicle is subjected while traveling over uneven terrain. The distortion of the vehicle due to the torsional stresses is about the longitudinal axis of the vehicle that extends longitudinally through the center of the haulage compartment. With this arrangement, the relatively rigid axle assemblies are free to pivot about the longitudinal axis of the haulage vehicle, as is illustrated in FIG. 2, and the side plates 18 and 20 of the haulage vehicle flex or twist and thereby permit the pivoting action of the axle assemblies.

FIGS. 1 and 2 clearly illustrate the manner in which the haulage vehicle flexes as it travels over uneven terrain. For example, in FIG. 1 the right front wheel designated by the letter A is in an elevated plane relative to the left front wheel B. The front axle assembly diagrammatically illustrated and designated by the letter C is in an inclined plane and is pivoted relative to the longitudinal axis of the vehicle. The rear left wheel generally designated D is in an elevated plane relative to the right rear wheel E. The rear axle assembly F is also pivoted about the longitudinal axis of the vehicle. The main body assembly between the front axle assembly C and the rear axle assembly F is subjected to a torsion or twisting force because of the angular relation between the axes of the axle assemblies C and F. The flexibility of the side plates 18 and 20 and the deck plate 26 permits the haulage vehicle between the axle assemblies to twist under these torsional forces to maintain the propelling wheels in contact with the ground while the vehicle passes over uneven terrain.

The side plates 18 and 20 of the main body assembly are preferably fabricated from a relatively thin flexible metal such as high strength low alloy steel plates sold by United States Steel Company under the trademark "T-1" steel. It should be understood, however, that other types of flexible, relatively thin metal having high strengths may be employed in fabricating the side plates 18 and 20. The other plate-like members of the haulage vehicle may also be fabricated from a relatively thin, flexible, high strength steel. The thin flexible metal reduces the tare weight of the vehicle and provides a vehicle having a greater haulage capacity when compared with a conventional haulage vehicle having a heavy, rigid haulage compartment.

Where it is desired to increase the flexibility of the haulage vehicle for severe undulation in the terrain, the embodiment of the axle assemblies illustrated in FIGS. 15, 16 and 17 may be used. The rotatable connection between one side of the axle assembly and the side plate of the haulage vehicle free certain of the axle brackets for movement relative to the adjacent side plate and permits relative movement between the axle assembly and the body side plate. The axle assembly, when pivoting as illustrated in FIG. 2, is free to rotate relative to the side plate 18 and thereby provide a greater degree of flexibility in the body of the haulage vehicle.

According to the provisions of the patent statutes, we have explained the principle, preferred construction and mode of operation of our invention and have illustrated and described what we now consider to represent its best embodiments. However, we desire to have it understood that, the invention may be practiced otherwise than as specifically illustrated and described.

What is claimed is:

1. An axle assembly for supporting an end of a haulage vehicle on a pair of driven and steerable wheel units positioned on opposite sides of said haulage vehicle and having a transverse drive shaft with a drive axis extending between said wheel units comprising, a pair of spaced wheel unit mounting brackets positioned in spaced relation to each other, each of said wheel unit mounting brackets having a first axle bracket positioned on one side of said transverse drive axis and a second separate axle bracket positioned on the other side of said transverse drive axis, said axle brackets having a plurality of apertures therethrough, support members extending transversely between said spaced wheel mounting brackets, said support members extending through said apertures in said axle brackets and secured to said axle brackets to thereby connect said wheel mounting unit brackets to each other and support the haulage vehicle in compression, and other support members extending transversely between said spaced wheel mounting brackets, said other support members secured to the wheel mounting brackets at a location below said first named support members and adjacent the lower edge of said wheel mounting brackets, said other support members arranged to support the haulage vehicle in tension.

2. An axle assembly for a haulage vehicle as set forth in claim 1 in which, said haulage vehicle has a first verticle side plate with a cylindrical receiver extending laterally therefrom, one of said axle brackets having a cylindrical support positioned in said cylindrical receiver to permit relative rotation between said haulage vehicle side plates when said haulage vehicle is subjected to torsional stresses.

3. An axle assembly for a haulage vehicle as set forth in claim 1 in which, said haulage vehicle includes a pair of spaced side plates, said wheel mounting brackets each includes a vertical plate secured thereto in spaced parallel relation to each other, said vertical plates arranged to be secured to the vertical side plates of the haulage vehicle.

4. An axle assembly for a haulage vehicle as set forth in claim 1 in which, said haulage vehicle includes a pair of spaced side plates, one of said plates having a cylindrical receiver extending laterally therefrom, said wheel brackets each include a pair of axle brackets arranged in spaced relation to each other on opposite sides of a transverse drive axis, said axle brackets having a plurality of apertures therethrough, said first named support members extending through said axle bracket apertures and secured to said axle brackets thereby forming a relatively rigid axle assembly, a vertical plate secured to one of said axle brackets and arranged to be rigidly secured to a side plate of the haulage vehicle, said vertical plate having a drive shaft aperture therethrough, a second plate secured to said other wheel bracket and having a drive shaft aperture therethrough aligned with said vertical plate drive shaft aperture, said second plate arranged to be positioned in overlying relation with a cylindrical receiver extending laterally from a second side plate of the haulage vehicle, a cylindrical support positioned in said cylindrical receiver and secured to said second plate to permit relative rotation between said wheel bracket and said vehicle side plate when said haulage vehicle is subjected to torsional stresses.

References Cited

UNITED STATES PATENTS

| | | | |
|---|---|---|---|
| 95,726 | 10/1869 | Rinkin | 301—124 |
| 400,817 | 4/1889 | Allen | 301—124 |
| 162,729 | 4/1875 | Wheeler | 301—129 |
| 609,925 | 8/1893 | Arnold | 301—129 |
| 630,054 | 8/1899 | Heymann et al. | |
| 2,113,403 | 4/1938 | Harmon | 280—106 |
| 3,185,325 | 5/1965 | Stalker et al. | 214—83.36 |

A. HARRY LEVY, Primary Examiner

U.S. Cl. X.R.

280—80, 106; 301—125